United States Patent
Todd et al.

(10) Patent No.: US 7,473,209 B2
(45) Date of Patent: Jan. 6, 2009

(54) TORQUE BASED TRANSFER CASE CONTROL

(75) Inventors: Matt Todd, Canton, MI (US); John A. Glab, Riverview, MI (US); Ashok Rodrigues, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 402 days.

(21) Appl. No.: 11/501,269

(22) Filed: Aug. 9, 2006

(65) Prior Publication Data

US 2008/0039287 A1 Feb. 14, 2008

(51) Int. Cl.
*B60W 10/02* (2006.01)
*B60W 10/04* (2006.01)

(52) U.S. Cl. ................................ 477/174; 477/179

(58) Field of Classification Search .............. 477/174, 477/179

See application file for complete search history.

(56) References Cited

U.S. PATENT DOCUMENTS

| | | | |
|---|---|---|---|
| 4,711,333 A * | 12/1987 | Okamura | 477/176 |
| 6,511,397 B2 * | 1/2003 | Glab et al. | 477/36 |
| 6,580,994 B2 | 6/2003 | Katayama et al. | |
| 6,823,252 B2 | 11/2004 | Ito et al. | |
| 6,873,896 B2 | 3/2005 | Maekawa et al. | |
| 6,969,337 B2 | 11/2005 | Kadota et al. | |
| 2004/0040759 A1 | 3/2004 | Shimizu et al. | |
| 2007/0295548 A1 * | 12/2007 | Boctor et al. | 180/245 |

* cited by examiner

*Primary Examiner*—Tisha D Lewis
(74) *Attorney, Agent, or Firm*—David B. Kelley; Macmillan, Sobanski & Todd, LLC

(57) ABSTRACT

A method for controlling operation of a transfer case clutch in a motor vehicle driveline controlled by an engine throttle having a variable position. The transfer case transmits rotating power to a primary power path and to a secondary power path in response to an electric current duty cycle applied to a coil that actuates the clutch. The method includes the steps of determining that a current vehicle speed is less than a reference vehicle speed; determining that the engine throttle position is in a reference throttle position range; determining that a change in vehicle speed is greater than a reference change in vehicle speed; using a current magnitude of torque in the driveline to determine a desired duty cycle for the coil; and applying a duty cycle of the desired magnitude to the coil.

14 Claims, 4 Drawing Sheets

| DRIVELINE TORQUE | TRANSFER CLUTCH DUTY CYCLE |
|---|---|
| N-m | PERCENT (%) |
| HIGH | HIGH |
|  |  |
|  |  |
|  |  |
|  |  |
|  |  |
|  |  |
| 0 | ABOUT 10 |

FIG. 4

TORQUE BASED TRANSFER CASE CONTROL

BACKGROUND OF THE INVENTION

The preferred embodiment relates generally to a strategy for controlling a motor vehicle transfer case clutch. More particularly, it pertains determining and applying a desired duty cycle to a coil that actuates the clutch in response to a current torque magnitude in the driveline.

An automotive vehicle driveline whose powertrain has electronic engine throttle control is able to maintain a moderately high magnitude of torque during a period after the driver has released the accelerator pedal. A driveline system that preemptively engages its 4WD system based on driver intent is susceptible to wheel slip on surfaces having a low coefficient of friction. A vehicle driveline that simply engages its transfer clutch and produces 4WD engagement with reference to engine torque is at risk of inadvertent engagement during engine idle conditions when engine idle torque is high.

A motor vehicle driveline with 4WD clutches that tend to exhibit some degree of stick-slip may experience a bump or bang as the clutch is turned off and energy trapped by the clutch is suddenly released.

There is need for a driveline system that eliminates wheel slip due to off-throttle residual torque, that does not bind-up in turns, that only activates on slippery road surfaces, thereby reducing the possibility of customer-detectable NVH associated with clutch engagement, and that prevents occurrence of a bump when the transfer clutch releases.

SUMMARY OF THE INVENTION

According to a preferred embodiment, a control method applies to controlling operation of a transfer case clutch in a motor vehicle driveline controlled by an engine throttle having a variable position. The transfer case transmits rotating power to a primary power path and to a secondary power path in response to an electric current duty cycle applied to a coil that actuates the clutch. The method includes the steps of determining that a current vehicle speed is less than a reference vehicle speed; determining that the engine throttle position is in a reference throttle position range; determining that a change in vehicle speed is greater than a reference change in vehicle speed; using a current magnitude of torque in the driveline to determine a desired duty cycle for the coil; and applying a duty cycle of the desired magnitude to the coil.

The control strategy provides for a map that sets a specific clutch duty cycle for a given level of engine torque. The strategy employs an arming mechanism that only activates the transfer clutch vs. torque map when a surface having a low coefficient of friction is detected. This detection is done by checking when the current value or rate change of speed difference between front and rear wheels is sufficiently high while the driver is at a sufficient throttle setting and vehicle speed is low enough. The strategy multiplies incoming torque by a calibratable value when the system is operating in 4×4 Low mode. To account for changes in idle calibration and system dynamics, flexibility is provided to set this value to something other than the 4×4 Low gear ratio.

Because driver intent mechanisms are often more powerful predictors of the need for clutch activation in a driven state, the strategy provides for activation only when the accelerator pedal position is below a calibratable value.

High clutch engagement levels will cause vehicles to "bind" or crow-hop in tight turns if the vehicle is on a pavement surface. To alleviate this tendency, the strategy looks at the real or inferred steering wheel angle and disables the higher values of the clutch vs. torque map. In a key element, the lowest level of duty cycle is not disabled, permitting the system to maintain torque capacity of the transfer clutch higher than the standard setting, but low enough not to bind in a turn. This substantially reduces the severity of any bump that might occur as clutch torque capacity declines from its higher level.

The system only permits a return to the lower standard setting after speeds are high enough that the release of trapped energy is not detectable by the customer.

The strategy provides for the ability to turn it on only in specific system modes (4-Auto, 4-High, and 4-Low). It also provides for the ability to have the steering wheel input described above only disable the clutch vs. torque map in specific system modes.

The strategy optionally provides for the ability to also trigger the clutch based on a rate change of powertrain torque, instead of the magnitude of torque alone.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which:

FIG. 4 is a table relating the transfer clutch duty cycle to a reference magnitude of torque in the powertrain.

DESCRIPTION OF THE PREFERRED EMBODIMENT

Figure 1:
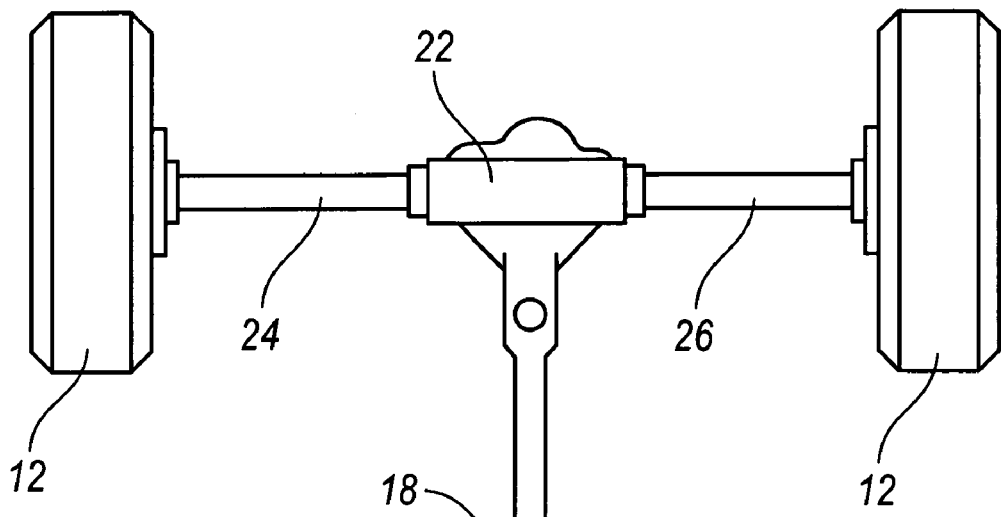
FIG. 1 is a plan view of a motor vehicle driveline, which includes a transmission, transfer case, front and rear drive shafts, and shafts extending to front wheels and rear wheels.
Figure 1:
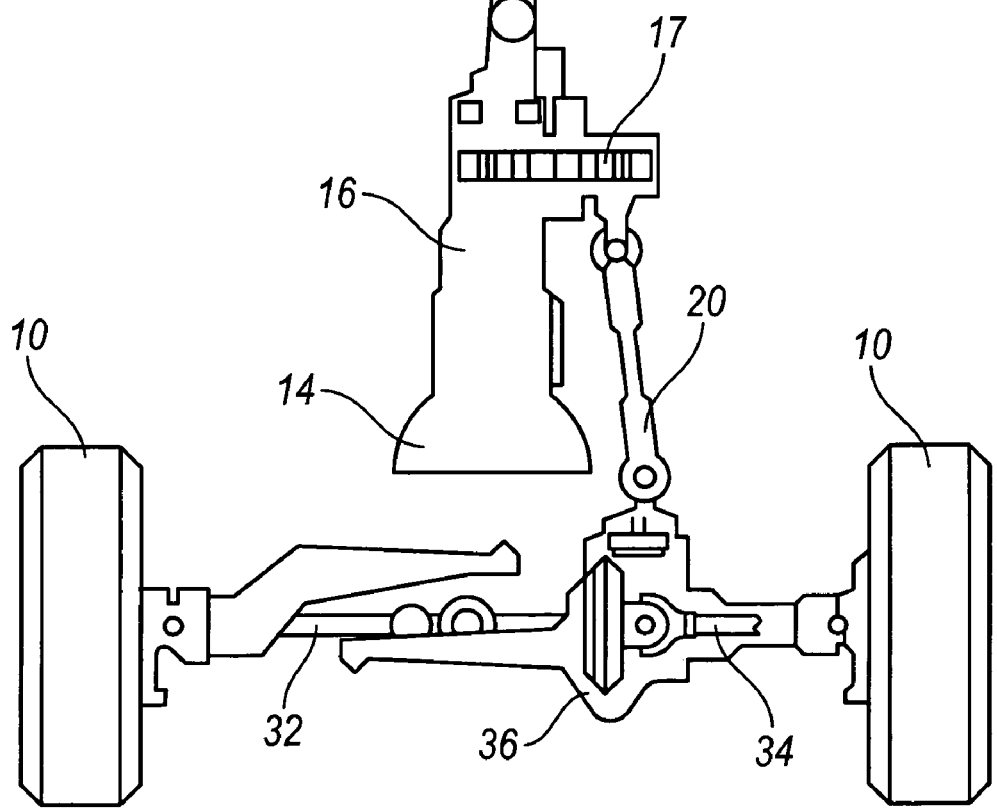

Referring to the drawings particularly to FIG. 1, the powertrain of a motor vehicle, to which the present invention can be applied, includes front and rear wheels 10, 12, a torque converter 14 driveably connected to an engine output and to a transmission input, a power transmission 16 for producing multiple forward and reverse speed ratios, and a transfer case 17 for continuously driveably connecting the transmission output to a rear drive shaft 18. The transfer case 17 selectively connects the transmission output to both the front drive shaft 20 and rear drive shaft 18 when a four-wheel drive mode of operation is selected, either manually or electronically. Rear drive shaft 18 transmits power to a differential mechanism 22, from which power is transmitted differentially to the rear wheels 12 through axle shafts 24, 26, which are contained within a differential housing. The front wheels are driveably connected to right-hand and left-hand halfshafts 32, 34, to which power is transmitted from the front drive shaft 20 through a front differential mechanism 36.

The transfer case assembly 17 continually transmits rotating power to the rear driveshaft 18 and rear wheels 12, which is the primary power path. The transfer case 17 intermittently transmits rotating power to the front driveshaft 20 and the front wheels 10, which is the secondary power path, when a clutch 42, located in the transfer case 17, is actuated.

Figure 2:
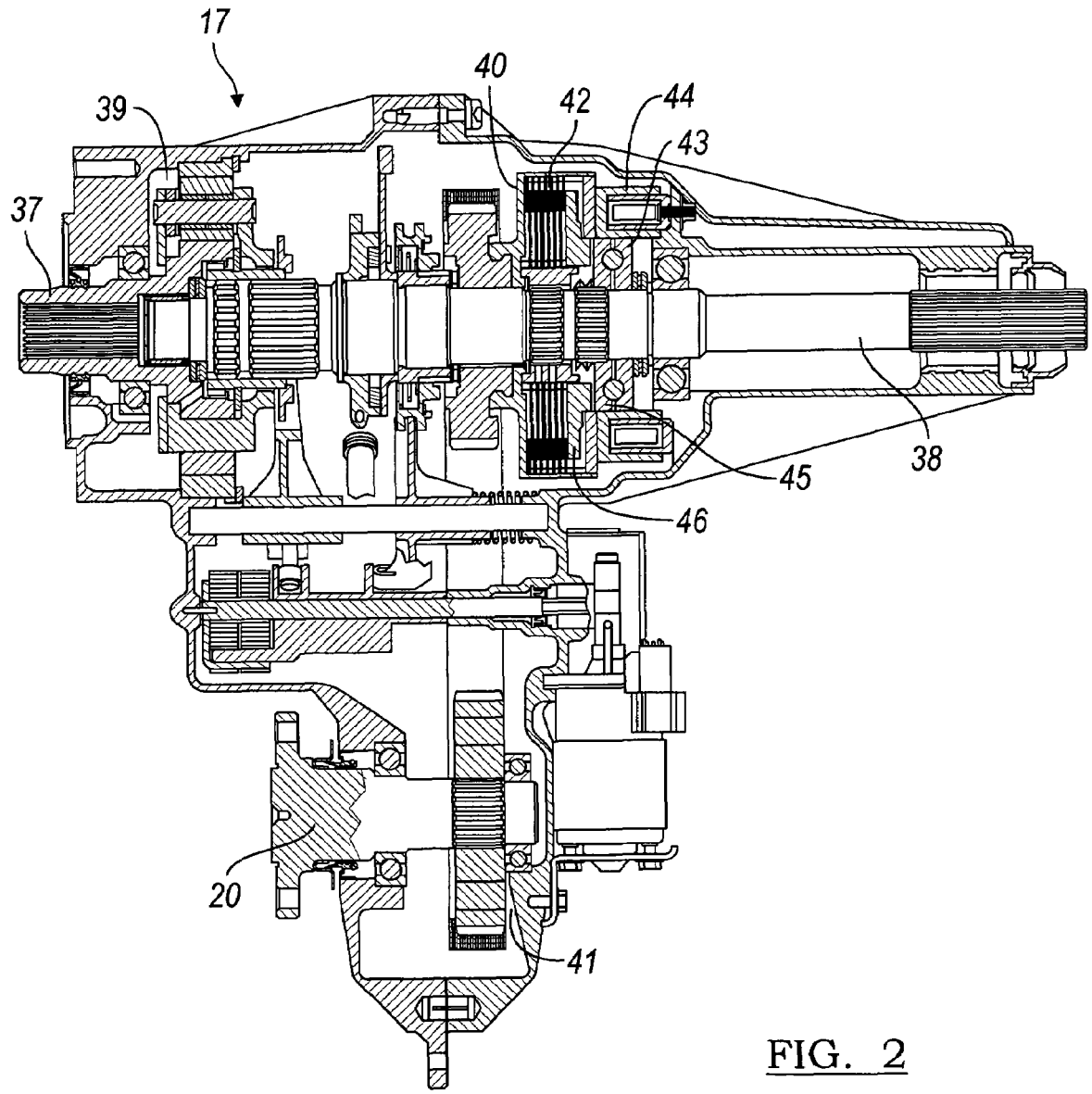
FIG. 2 is a cross section of a mechanism for transmitting torque in the transfer case.

FIG. 2, a cross section of the transfer case 17, shows a transmission output shaft 37, a main shaft 38, driveably coupled to shaft 37 through a speed reduction gear set 39, a first sprocket wheel 40 supported on shaft 38, and a second sprocket wheel 41, driveably connected by a chain to the first sprocket wheel. Main shaft 38 is driveably connected by a spline to the rear driveshaft 18. Sprocket wheel 41 is driveably connected to the front drive shaft 20.

The housing and an outer set of clutch plates of a multi-plate friction clutch 42 are splined to sprocket wheel 40. An inner set of friction plates, interleaved with the plates of the outer set, are splined to main shaft 38. Therefore, the inner set of plates rotate with the rear driveshaft 18, and the outer set of plates rotate with the front driveshaft 20.

One-half 43 of a ball-cam mechanism is secured to the housing of an electric coil 44, which is concentric with the central axis and encircles the main shaft 38. The other half 45 of the ball-cam mechanism is splined to the main shaft 38.

When the coil 44 is deenergized, a clutch apply plate 46, located adjacent the clutch 42, is spaced from the ball-cam mechanism, and no torque is transmitted from main shaft 38 to the front drive shaft 20 through clutch 42 and the sprocket wheels 40, 41. All of the torque is transmitted to the rear drive shaft 18 from main shaft 38. But when coil 44 is energized with electric current, the ball-cam mechanism 43, 45 forces the apply plate 46 against the clutch, forcing the inner and outer plates into frictional engagement and transmitting torque to the front driveshaft 20 through clutch 42 and the sprocket wheels 40, 41.

Figure 3:
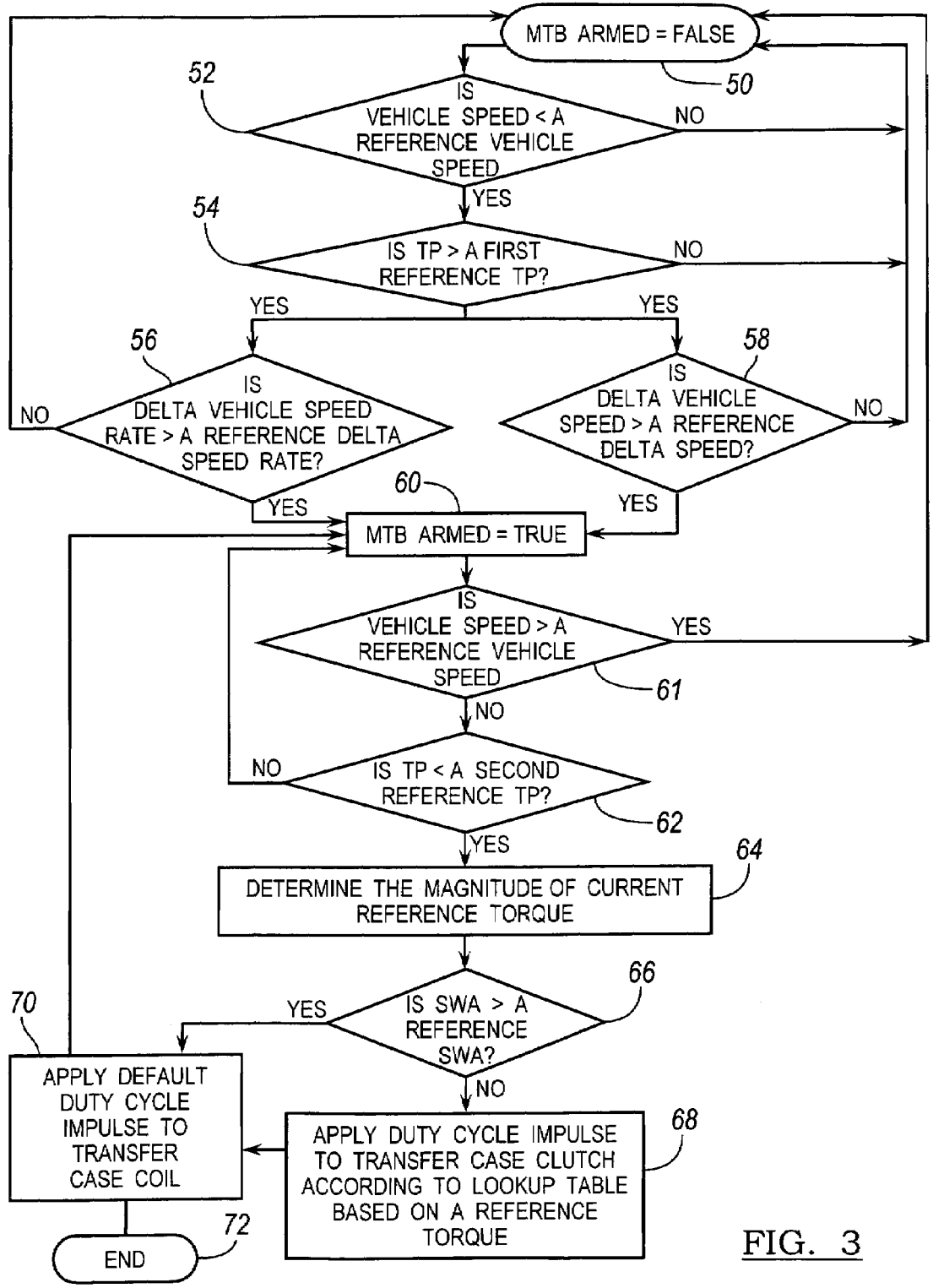
FIG. 3 is a logic diagram illustrating method steps for controlling actuation of the transfer clutch in the transfer case in response to powertrain torque.

FIG. 3 illustrates the steps of a method for controlling actuation of the of the transfer case clutch 42 by energizing and deenergizing coil 44 in response to powertrain torque output. Preferably, data communications occurs with CAN messages using a universal bus protocol.

At step 50, the control algorithm is entered, but clutch 42 continues to be controlled by another control algorithm, and the minimalized-torque-base strategy (MTB) of the control algorithm is inoperative, i.e., false, pending the result of tests for the presence of certain initial conditions.

At step 52, a test is made to determine whether the current vehicle speed is less than a predetermined calibratable vehicle speed. If the test at step 52 is logically false, the control algorithm returns to step 50. But if the test at step 52 is logically true, the control algorithm advances to step 54 after determining the current throttle position TP.

At step 54, a test is made to determine whether the current throttle position is greater than a first predetermined calibratable throttle position. If the test at step 54 is logically false, the control algorithm returns to step 50. But if the test at step 54 is logically true, the control algorithm advances to step 56 after determining the current time rate of change of vehicle speed between sampling intervals, and to step 58 after determining the current change in vehicle speed since a previous sampling interval, preferable the immediately prior sample.

At step 56, a test is made to determine whether the current time rate of change of vehicle speed between sampling intervals is greater than a predetermined calibratable time rate of change of vehicle speed. If the test at step 56 is logically false, the control algorithm returns to step 50. But if the test at step 56 is logically true, the control algorithm advances to step 61.

At step 58, a test is made to determine whether the current change of vehicle speed between sampling intervals is greater than a predetermined calibratable change of vehicle speed. If the test at step 58 is logically false, the control algorithm returns to step 50. But if the test at step 58 is logically true, the control algorithm advances to step 60. At step 60, if at least one of the tests made at steps 56 and 58 is true, the initial conditions are present, the control strategy is operative, and the control algorithm advances to step 61.

At step 61, a test is made to determine whether the current vehicle speed is greater than a reference calibratable vehicle speed. If the test at step 61 is logically false, then the control algorithm proceeds to step 62. If the test is logically true, the control algorithm goes to the false state and the preconditions must be met again as described with reference to steps 52, 54, 56, 58 before the strategy can become active again.

At step 62, a test is made to determine whether the current throttle position is less than a second predetermined calibratable throttle position. If the test at step 62 is logically false, the control algorithm returns to step 60. But if the test at step 62 is logically true, the control algorithm advances to step 64.

At step 64, the current magnitude of torque at the transmission output shaft 37 is determined by calculation with reference to the current engine output torque, the torque amplification currently produced by torque converter 14, and the torque ratio currently produced by the power transmission 16.

FIG. 4 illustrates an example of a function, stored in electronic memory in the form of a look-up table accessible to the controller, which controls operation of the transfer clutch 42. The function of FIG. 4 relates torque at the transmission output shaft 37 to a corresponding duty cycle for the transfer clutch 42. At step 66, the clutch duty of the transfer clutch 42 for the reference torque is determine and applied to coil 44.

When the transfer case is operating in 4×4 mode with the transfer case producing a low range, sometime referred to as a 4×4 Low mode, the duty cycle is, instead, determined from the table of FIG. 4 using as a reference torque the product produced by multiplying a predetermine scalar and the current engine output torque, rather than using the current transmission output torque.

After step 66 is executed, control advances to step 68 where a test is made to determine whether the current steering wheel angle (SWA) is greater than a reference SWA. If the test at step 68 is logically false, control returns to step 66 where the duty cycle corresponding to the reference toque magnitude is applied to coil 44. But if the test at step 68 is logically true, indicating that SWA is excessive, at step 70 a default duty cycle is applied to coil 44. Preferably, the default duty cycle magnitude is 10 percent. In either case, the control algorithm is exited at step 72.

Numbers cited here and representing the magnitudes of specific variables and parameters for a particular application are calibratable and subject to wide variation in other applications of the control strategy from the magnitudes mentioned here.

References throughout the description of the control strategy and the claims to engine throttle position indicates that the motor vehicle is equipped with an electronic throttle system, in which a microprocessor controls the engine throttle opening or position as a function of vehicle speed, accelerator pedal position, the time rate of change of accelerator pedal position, and other variables, rather than by accelerator pedal position alone. However, the control strategy is applicable also to vehicles in which the engine throttle position is mechanically connected directly to the accelerator pedal. Therefore, references to "engine throttle position" are interchangeable with "accelerator pedal position."

Although the powertrain of the vehicle is described with reference to one in which the rear wheels are in a primary power path and the front wheels are in a secondary power path, the control strategy is also applicable to a powertrain in which the front rear wheels are in the primary power path and the rear wheels are in the secondary power path.

In accordance with the provisions of the patent statutes, the preferred embodiment has been described. However, it should be noted that the alternate embodiments can be practiced otherwise than as specifically illustrated and described.

What is claimed is:

1. A method for controlling operation of a transfer case clutch in a motor vehicle driveline controlled by an engine throttle having a variable position, the transfer case transmitting rotating power to a primary power path and to a secondary power path in response to an electric current duty cycle applied to a coil that actuates the clutch, the method comprising the steps of:
    (a) determining that a current vehicle speed is less than a reference vehicle speed;
    (b) determining that the engine throttle position is in a reference throttle position range;
    (c) determining that a change in vehicle speed is greater than a reference change in vehicle speed;
    (d) using a current magnitude of torque in the driveline to determine a desired duty cycle for the coil; and
    (e) applying a duty cycle of the desired magnitude to the coil.

2. The method of claim 1, wherein step (e) further includes the step of:
    changing the magnitude of torque transmitted by the clutch to the secondary power path upon applying a duty cycle of the desired magnitude to the coil.

3. The method of claim 1, wherein step (d) further includes the steps of:
    determining the current magnitude of engine output torque;
    calculating the magnitude of torque at a transmission output from the current magnitude of engine output torque; and
    using the calculated magnitude of torque at a transmission output to determine the desired duty cycle for the coil.

4. The method of claim 1, wherein step (d) further includes the steps of:
    determining the current magnitude of engine output torque;
    calculating a product by multiplying the current magnitude of engine output torque by a predetermined factor; and
    using the calculated product to determine the desired duty cycle for the coil.

5. The method of claim 1, further comprising the step of:
    determining that the driveline is operating in a predetermined mode, and wherein step (d) further includes the steps of:
    determining the current magnitude of engine output torque;
    calculating a product by multiplying the current magnitude of engine output torque by a predetermined factor; and
    using the calculated product to determine the desired duty cycle for the coil.

6. A method for controlling operation of a transfer case clutch in a motor vehicle driveline controlled by an engine throttle having a variable position, the transfer case transmitting rotating power to a primary power path and to a secondary power path in response to an electric current duty cycle applied to a coil that actuates the clutch, the method comprising the steps of:
    (a) determining that a current vehicle speed is less than a reference vehicle speed;
    (b) determining that the engine throttle position is in a reference throttle position range;
    (c) determining that a time rate of change in vehicle speed is greater than a reference rate of change in vehicle speed;
    (d) using a current magnitude of torque in the driveline to determine a desired duty cycle for the coil; and
    (e) applying a duty cycle of the desired magnitude to the coil.

7. The method of claim 6, wherein step (e) further includes the step of:
    changing the magnitude of torque transmitted by the clutch to the secondary power path upon applying a duty cycle of the desired magnitude to the coil.

8. The method of claim 6, wherein step (d) further includes the steps of:
    determining the current magnitude of engine output torque;
    calculating the magnitude of torque at a transmission output from the current magnitude of engine output torque; and
    using the calculated magnitude of torque at a transmission output to determine the desired duty cycle for the coil.

9. The method of claim 6, wherein step (d) further includes the steps of:
    determining the current magnitude of engine output torque;
    calculating a product by multiplying the current magnitude of engine output torque by a predetermined factor; and
    using the calculated product to determine the desired duty cycle for the coil.

10. The method of claim 6, further comprising the step of:
    determining that the driveline is operating in a predetermined mode, and wherein step (d) further includes the steps of:
    determining the current magnitude of engine output torque;
    calculating a product by multiplying the current magnitude of engine output torque by a predetermined factor; and
    using the calculated product to determine the desired duty cycle for the coil.

11. A method for controlling operation of a transfer case clutch in a motor vehicle driveline controlled by an engine throttle having a variable position, the transfer case transmitting rotating power to a primary power path and to a secondary power path in response to an electric current duty cycle applied to a coil that actuates the clutch, the method comprising the steps of:
    (a) determining that a current vehicle speed is less than a reference vehicle speed;
    (b) determining that the engine throttle position is greater than a first reference throttle position;
    (c) determining whether a change in vehicle speed is greater than a reference change in vehicle speed;
    (d) determining whether a time rate of change in vehicle speed is greater than a reference rate of change in vehicle speed;
    (e) after executing steps (a) and (b) and provided that either of steps (c) and (d) is logically true, determining that the engine throttle position is less than a second reference throttle position;
    (f) using a current magnitude of torque in the driveline to determine a desired duty cycle for the coil; and
    (g) applying a duty cycle of the desired magnitude to the coil.

12. The method of claim 11, wherein step (f) further includes the steps of:
  determining the current magnitude of engine output torque;
  calculating the magnitude of torque at a transmission output from the current magnitude of engine output torque; and
  using the calculated magnitude of torque at a transmission output to determine the desired duty cycle for the coil.

13. The method of claim 11, wherein step (f) further includes the steps of:
  determining the current magnitude of engine output torque;
  calculating a product by multiplying the current magnitude of engine output torque by a predetermined factor; and
  using the calculated product to determine the desired duty cycle for the coil.

14. The method of claim 11, further comprising the step of:
  determining that the driveline is operating in a predetermined mode, and wherein step (d) further includes the steps of:
  determining the current magnitude of engine output torque;
  calculating a product by multiplying the current magnitude of engine output torque by a predetermined factor; and
  using the calculated product to determine the desired duty cycle for the coil.

* * * * *